(12) United States Patent
Vadnerkar et al.

(10) Patent No.: US 11,251,702 B2
(45) Date of Patent: Feb. 15, 2022

(54) BOOST CONVERTER WITH FORCED CONTINUOUS CONDUCTION MODE

(71) Applicant: Cirrus Logic International Semiconductor Ltd., Edinburgh (GB)

(72) Inventors: Sarang Vadnerkar, Austin, TX (US); Ullas Pazhayaveetil, Cedar Park, TX (US); Eric J. King, Dripping Springs, TX (US)

(73) Assignee: Cirrus Logic, Inc., Austin, TX (US)

( * ) Notice: Subject to any disclaimer, the term of this patent is extended or adjusted under 35 U.S.C. 154(b) by 509 days.

(21) Appl. No.: 15/432,150

(22) Filed: Feb. 14, 2017

(65) Prior Publication Data
US 2018/0234014 A1 Aug. 16, 2018

(51) Int. Cl.
*H02M 3/157* (2006.01)
*H02M 1/08* (2006.01)
*H02M 3/158* (2006.01)
*H02M 1/00* (2006.01)

(52) U.S. Cl.
CPC ............. *H02M 3/157* (2013.01); *H02M 1/08* (2013.01); *H02M 3/1588* (2013.01); *H02M 1/0009* (2021.05); *H02M 1/0058* (2021.05); *Y02B 70/10* (2013.01)

(58) Field of Classification Search
CPC ........ H02M 1/084; H02M 1/10; H02M 3/158; H02M 2001/009; H02M 1/009
See application file for complete search history.

(56) References Cited

U.S. PATENT DOCUMENTS

| | | |
|---|---|---|
| 2008/0049473 A1 | 2/2008 | Sugahara et al. |
| 2011/0148377 A1 | 6/2011 | Schiff et al. |
| 2013/0027006 A1 | 1/2013 | Holloway et al. |
| (Continued) | | |

FOREIGN PATENT DOCUMENTS

WO 2012113015 A1 8/2012

OTHER PUBLICATIONS

International Search Report and Written Opinion of the International Searching Authority, International Application No. PCT/US2018/017782, dated May 22, 2018.
(Continued)

*Primary Examiner* — Rafael O De Leon Domenech
(74) *Attorney, Agent, or Firm* — Jackson Walker L.L.P.

(57) ABSTRACT

A method may include operating a DC-DC switch converter in a forced continuous conduction mode in which for each switching cycle of the switch converter during the forced continuous conduction mode, the switch converter operates in a series of phases including: a first phase in which an inductor current flowing in an inductor of the switch converter increases from zero to a controlled positive current magnitude with respect to a first terminal and a second terminal of the inductor; a second phase in which the inductor current decreases from the controlled positive current magnitude to approximately zero; a third phase in which the inductor current decreases from approximately zero to a controlled negative current magnitude with respect to a first terminal and a second terminal of the inductor; and a fourth phase in which the inductor current increases from the controlled negative current magnitude to approximately zero.

22 Claims, 4 Drawing Sheets

(56) References Cited

U.S. PATENT DOCUMENTS

| | | | |
|---|---|---|---|
| 2014/0043004 A1* | 2/2014 | Abramov | H02M 3/1588 |
| | | | 323/283 |
| 2014/0320104 A1* | 10/2014 | Guo | H02M 1/14 |
| | | | 323/290 |
| 2016/0181921 A1 | 6/2016 | Zhang et al. | |
| 2016/0233768 A1* | 8/2016 | de Cremoux | H02M 3/157 |

OTHER PUBLICATIONS

Combined Search and Examination Report under Sections 17 and 18(3), UKIPO, Application No. GB1705106.1, dated Sep. 28, 2017.

\* cited by examiner

BOOST CONVERTER WITH FORCED CONTINUOUS CONDUCTION MODE

FIELD OF DISCLOSURE

The present disclosure relates in general to circuits for audio devices, including without limitation personal audio devices such as wireless telephones and media players, and more specifically, to a power converter capable of operating in a forced continuous conduction mode in order to achieve low power operation.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

In addition, in some applications, a power converter may be implemented to provide electrical energy to a Class-H amplifier in which the output voltage delivered to the power amplifier by the power converter tracks the voltage of the signal output by the Class-H amplifier, in order to reduce power consumption. Thus, traditional switching power converters may transition between discontinuous conduction mode (DCM) and continuous conduction mode (CCM) and vice versa to achieve improved power efficiency across wide load and input voltage ranges. In order to achieve even lower power consumption at light loads, several schemes have been developed to operate on variable switching frequencies in DCM. However, the power savings from these schemes are invariably limited since practical applications of these converters place a lower limit on either the switching frequency or the minimum duty cycle. This places a requirement on the minimum load current for the converter, which in turn places a lower limit on the minimum operating power draw.

SUMMARY

In accordance with the teachings of the present disclosure, one or more disadvantages and problems associated with existing approaches to operating a power converter may be reduced or eliminated.

In accordance with embodiments of the present disclosure, a method of operating a direct current-to-direct current (DC-DC) switch converter may include operating the DC-DC switch converter in a forced continuous conduction mode in which for each switching cycle of the DC-DC switch converter during the forced continuous conduction mode, the DC-DC switch converter operates in a series of phases including: a first phase in which a power inductor current flowing in a power inductor of the DC-DC switch converter increases from zero to a controlled positive current magnitude with respect to a first terminal and a second terminal of the power inductor; a second phase in which the power inductor current decreases from the controlled positive current magnitude to approximately zero; a third phase in which the power inductor current decreases from approximately zero to a controlled negative current magnitude with respect to a first terminal and a second terminal of the power inductor; a fourth phase in which the power inductor current increases from the controlled negative current magnitude to approximately zero; and a fifth phase in which the power inductor current is zero for the duration of the fifth phase.

In accordance with these and other embodiments of the present disclosure, a method of operating a direct current-to-direct current (DC-DC) switch converter may include operating the DC-DC switch converter in a forced continuous conduction mode in which, for some switching cycles of the DC-DC switch converter during the forced continuous conduction mode, the DC-DC switch converter operates in a first series of phases including: a first phase in which a power inductor current flowing in a power inductor of the DC-DC switch converter increases from zero to a controlled positive current magnitude with respect to a first terminal and a second terminal of the power inductor; a second phase in which the power inductor current decreases from the controlled positive current magnitude to approximately zero; a third phase in which the power inductor current decreases from approximately zero to a controlled negative current magnitude with respect to a first terminal and a second terminal of the power inductor; and a fourth phase in which the power inductor current increases from the controlled negative current magnitude to approximately zero. For other switching cycles of the DC-DC switch converter during the forced continuous conduction mode, the DC-DC switch converter may operate in a second series of phases including: the first phase; the second phase; the third phase; the fourth phase; and a fifth phase in which the power inductor current is zero for the duration of the fifth phase.

In accordance with these and other embodiments of the present disclosure, a direct current-to-direct current (DC-DC) switch converter may include a power inductor and a plurality of switches coupled to the power inductor and configured to operate the DC-DC switch converter in a forced continuous conduction mode in which for each switching cycle of the DC-DC switch converter during the forced continuous conduction mode, the DC-DC switch converter operates in a series of phases including: a first phase in which a power inductor current flowing in a power inductor of the DC-DC switch converter increases from zero to a controlled positive current magnitude with respect to a first terminal and a second terminal of the power inductor; a second phase in which the power inductor current decreases from the controlled positive current magnitude to approximately zero; a third phase in which the power inductor current decreases from approximately zero to a controlled negative current magnitude with respect to a first terminal and a second terminal of the power inductor; a fourth phase in which the power inductor current increases from the controlled negative current magnitude to approximately zero; and a fifth phase in which the power inductor current is zero for the duration of the fifth phase.

In accordance with these and other embodiments of the present disclosure, a direct current-to-direct current (DC-DC) switch converter may include a power inductor and a plurality of switches coupled to the power inductor and configured to operate the DC-DC switch converter in a forced continuous conduction mode in which, for some switching cycles of the DC-DC switch converter during the forced continuous conduction mode, the DC-DC switch converter operates in a first series of phases including: a first phase in which a power inductor current flowing in a power inductor of the DC-DC switch converter increases from zero to a controlled positive current magnitude with respect to a first terminal and a second terminal of the power inductor; a second phase in which the power inductor current decreases from the controlled positive current magnitude to approximately zero; a third phase in which the power inductor current decreases from approximately zero to a controlled negative current magnitude with respect to a first terminal and a second terminal of the power inductor; and a fourth phase in which the power inductor current increases from the controlled negative current magnitude to approximately zero. For other switching cycles of the DC-DC switch converter during the forced continuous conduction mode, the DC-DC switch converter may operate in a second series of phases including: the first phase; the second phase; the third phase; the fourth phase; and a fifth phase in which the power inductor current is zero for the duration of the fifth phase.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
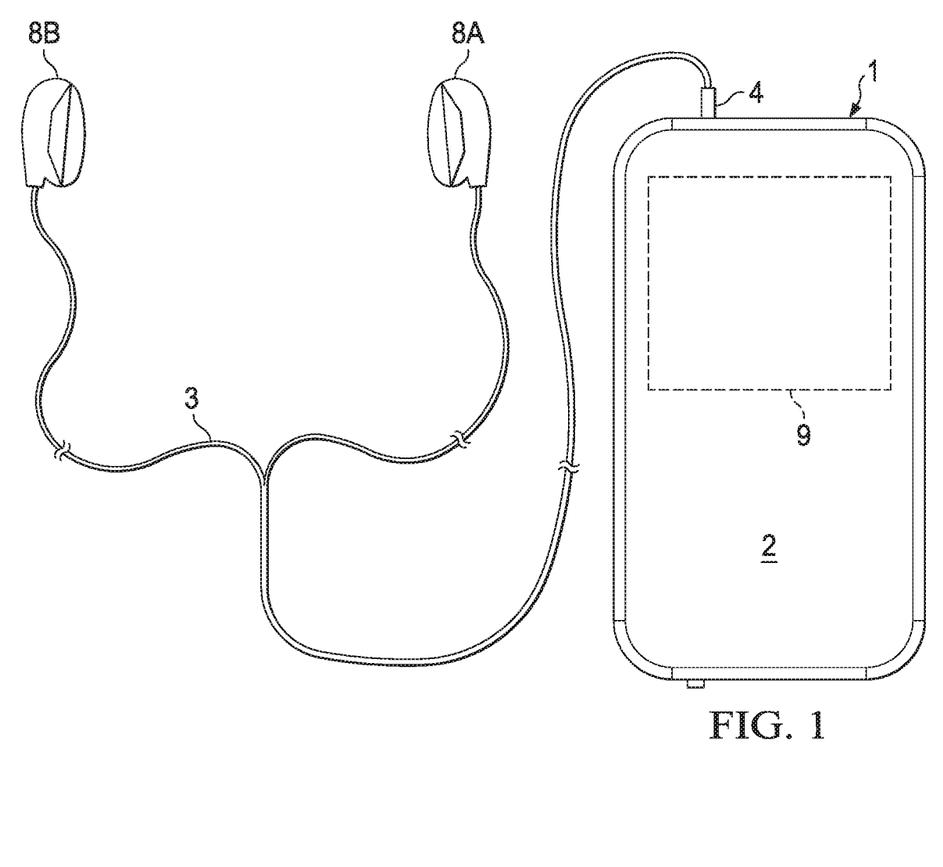
FIG. 1 illustrates an example personal audio device, in accordance with embodiments of the present disclosure.

FIG. 1 illustrates an example personal audio device 1, in accordance with embodiments of the present disclosure. FIG. 1 depicts personal audio device 1 coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to headset 3 and/or another audio transducer.

Figure 2:
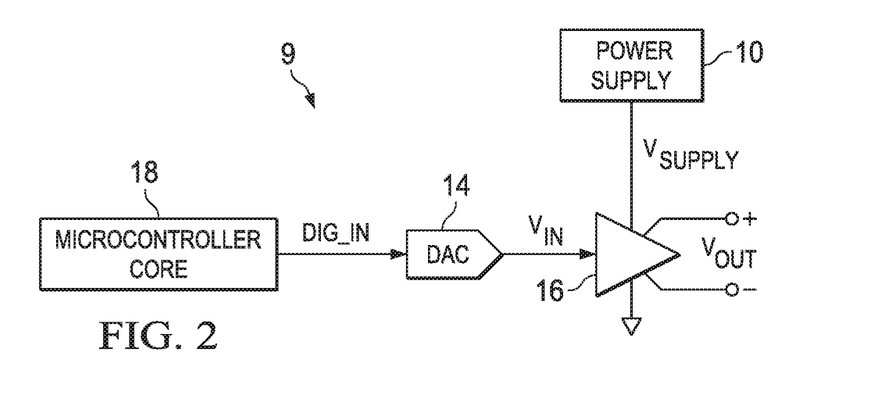
FIG. 2 illustrates a block diagram of selected components of an example audio integrated circuit of a personal audio device, in accordance with embodiments of the present disclosure.

FIG. 2 illustrates a block diagram of selected components of an example audio IC 9 of a personal audio device, in accordance with embodiments of the present disclosure. As shown in FIG. 2, a microcontroller core 18 may supply a digital audio input signal DIG_IN to a digital-to-analog converter (DAC) 14, which may convert the digital audio input signal to an analog signal $V_{IN}$. DAC 14 may supply analog signal $V_{IN}$ to an amplifier 16 which may amplify or attenuate audio input signal $V_{IN}$ to provide a differential audio output signal $V_{OUT}$, which may operate a speaker, a headphone transducer, a line level signal output, and/or other suitable output. In some embodiments, DAC 14 may be an integral component of amplifier 16. A power supply 10 may provide the power supply rail inputs of amplifier 16. In some embodiments, power supply 10 may comprise a switched-mode power converter, as described in greater detail below.

Although FIGS. 1 and 2 contemplate that audio IC 9 resides in a personal audio device, systems and methods described herein may also be applied to electrical and electronic systems and devices other than a personal audio device, including audio systems for use in a computing device larger than a personal audio device, an automobile, a building, or other structure.

Figure 3:
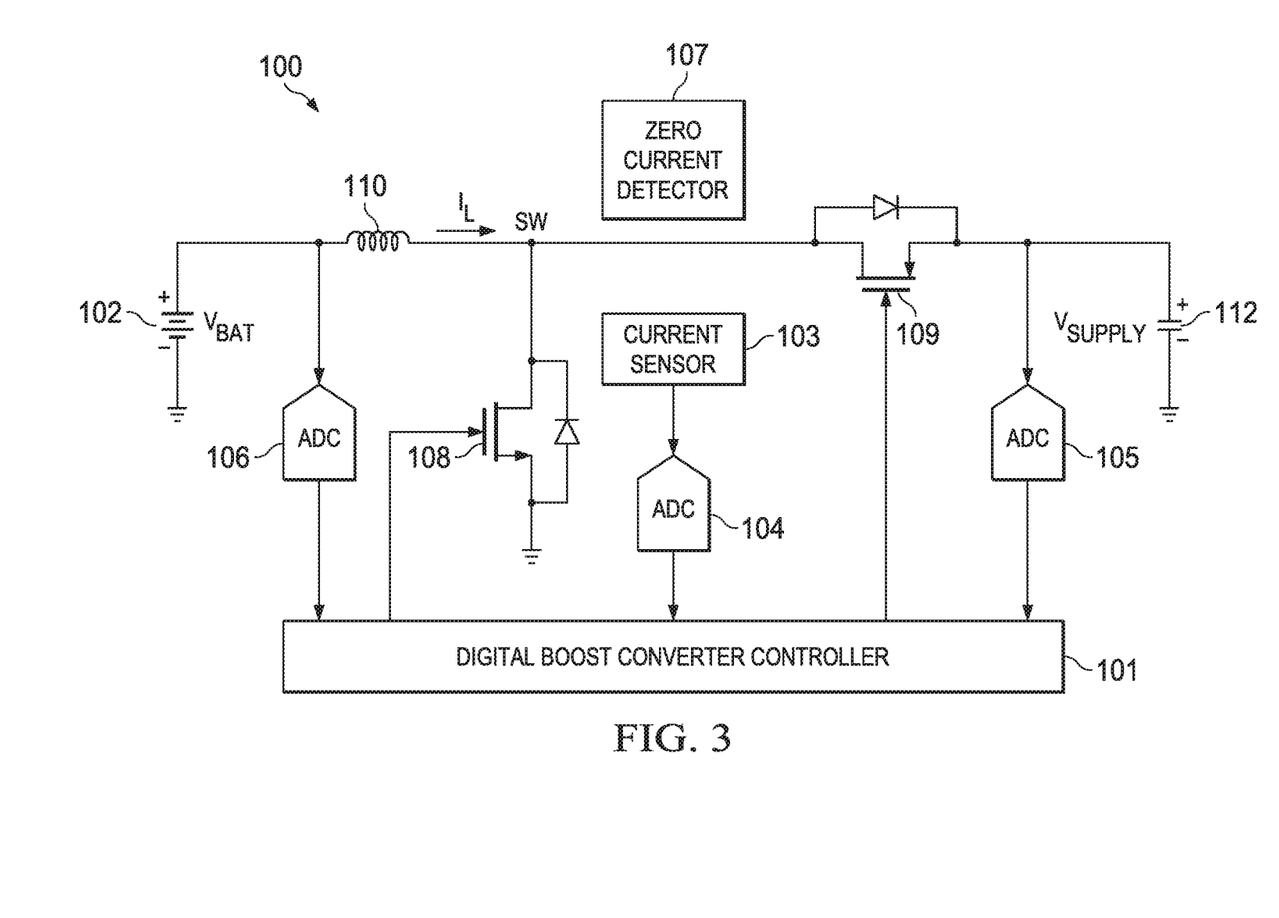
FIG. 3 illustrates a block diagram of selected components of an example peak-current control boost converter which may be used to implement the power supply shown in FIG. 2, in accordance with embodiments of the present disclosure.
Figure 4:
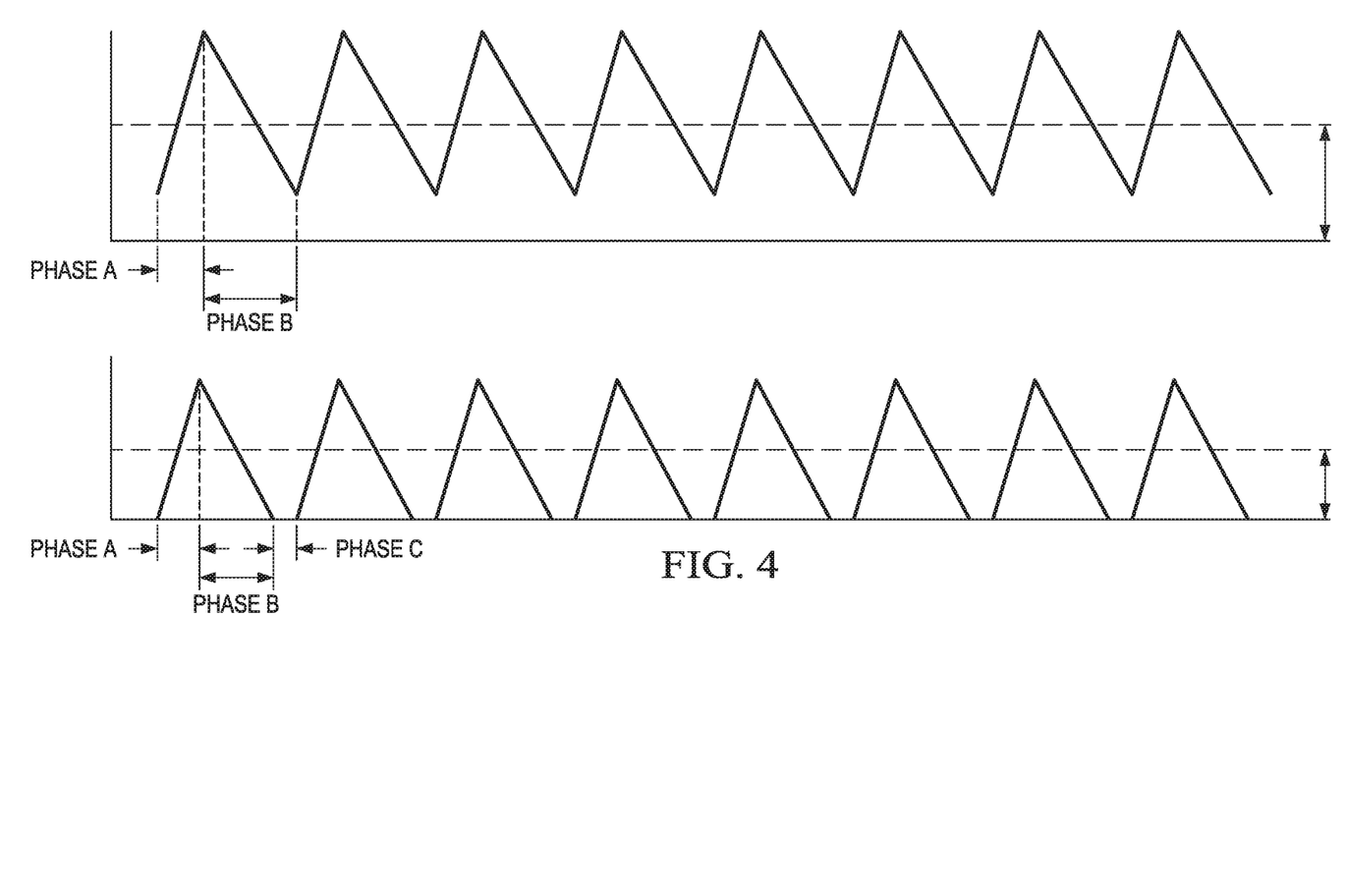
FIG. 4 illustrates graphs depicting example waveforms of inductor current versus time for various modes of operation of the power converter of FIG. 3, in accordance with embodiments of the present disclosure.

FIG. 3 illustrates a block diagram of selected components of an example peak-current control boost converter 100 which may be used to implement power supply 10 shown in FIG. 2, in accordance with embodiments of the present disclosure. As shown in FIG. 3, boost converter 100 may include a battery 102, a power inductor 110, a switch 108 implemented as an n-type metal-oxide-semiconductor field-effect transistor (NFET), a switch 109 implemented as a p-type metal-oxide-semiconductor field-effect transistor (PFET), a current sensor 103, a zero current detector 107, a plurality of ADCs 104, 105, and 106, a boost capacitor 112, and a digital boost converter controller 101. FIG. 4 illustrates operation of boost converter 100 in a continuous conduction mode (CCM) and a discontinuous conduction mode (DCM).

In a first phase of a switching cycle of boost converter 100 (labeled as "Phase A" in FIG. 4), digital boost converter controller 101 may cause switch 108 to be activated (e.g., closed, turned on, enabled) and switch 109 to be deactivated (e.g., opened, turned off, disabled). Thus, during the first phase (Phase A), a switch node (labeled as "SW" in FIG. 3) may be shorted to a ground potential, such that battery 102 applies its voltage $V_{BAT}$ across terminals of power inductor 110. As a result, an inductor current $I_L$ flowing in power inductor 110 may increase during the first phase (Phase A).

In a second phase of the switching cycle of boost converter 100 (labeled as "Phase B" in FIG. 4), digital boost converter controller 101 may cause switch 108 to be deactivated and switch 109 to be activated. As a result, inductor current $I_L$ may decrease during the second phase (Phase B) as power inductor 110 discharges into boost capacitor 112, boosting the supply voltage $V_{SUPPLY}$ to a voltage higher than battery voltage $V_{BAT}$. In CCM, the second phase (Phase B) may continue until the end of the switching cycle, after which the first phase (Phase A) again occurs. In DCM, the second phase (Phase B) may continue until inductor current $I_L$ reaches zero, at which point a third phase (labeled as "Phase C" in FIG. 4) of the switching cycle may begin. In the third phase (Phase C), digital boost converter controller 101 may cause both of switches 108 and 109 to be deactivated, and inductor current $I_L$ may remain at zero until the beginning of the next switching cycle, in which the first phase (Phase A) again occurs. In some embodiments, digital boost converter controller 101 may deactivate switch 109 during the second phase (Phase B), such that the body diode of the PFET implementing switch 109 conducts inductor current $I_L$ until it reaches zero.

In DCM operation, the first phase (Phase A) may begin in response to a rising edge of a clock signal internal to or provided to digital boost converter controller 101. The first phase (Phase A) may end, and the second phase (Phase B) may begin in response to digital boost converter controller 101 determining that inductor current $I_L$ has reached a peak current level, as sensed by current sensor 103. The second phase (Phase B) may end, and the third phase (Phase C) may begin in response to digital boost converter controller 101 determining that inductor current $I_L$ has reached zero, as sensed by zero current detector 107 in the event that switch 109 is activated during the second phase (Phase B) (otherwise, if switch 109 is deactivated during the second phase (Phase B), the end of the second phase (Phase B) may be auto-triggered by way of the body diode of switch 109 ceasing to conduct current once the inductor current $I_L$ reaches zero due to the polarity of the body diode).

In operation in both CCM and DCM, the duty cycle of switch 108 (e.g., the duration of the first phase (Phase A)) may determine the magnitude of supply voltage $V_{SUPPLY}$ relative to battery voltage $V_{BAT}$. Thus, for a desired level of supply voltage $V_{SUPPLY}$ (e.g., which may be based on an envelope of an output signal of an amplifier), digital boost converter controller 101 may implement a feedback control loop based on measured supply voltage $V_{SUPPLY}$ and measured inductor current $I_L$. To illustrate, supply voltage $V_{SUPPLY}$ may be measured by analog-to-digital converter (ADC) 105 which may measure the analog supply voltage $V_{SUPPLY}$, convert it into a digital signal indicative of the analog voltage, and communicate such digital signal to digital boost converter controller 101. Thus, digital boost converter controller 101 can monitor actual supply voltage $V_{SUPPLY}$, compare it against the desired supply voltage $V_{SUPPLY}$, and increase or decrease actual supply voltage $V_{SUPPLY}$ by increasing or decreasing the peak of inductor current $I_L$.

In addition, current sensor 103 may measure inductor current $I_L$ and communicate an analog signal indicative of inductor current $I_L$ to ADC 104, which may in turn convert the analog signal to a corresponding digital signal indicative of inductor current $I_L$. Current sensor 103 may measure inductor current $I_L$ in any suitable manner. Because the duration of the first phase (Phase A) may be based on when inductor current $I_L$ reaches a peak current level, in some embodiments, it may be necessary to measure inductor current $I_L$ only during the first phase (Phase A). Such measurement may thus be performed, for example, by mirroring a current flowing through switch 108 during the first phase (which, during the first phase, is equal to inductor current $I_L$) or measuring a voltage across a resistor placed in series with switch 108.

In order to control switches 108 and 109, digital boost converter controller 101 may output one or more pulse-width modulated control signals to switches 108 and 109 to control their respective duty cycles.

Existing architectures for boost converter-based power supplies typically use a static boosted supply voltage $V_{SUPPLY}$ (e.g., to supply an amplifier or other components). At lighter load levels (e.g., lower signal voltages output by an amplifier), many schemes exist that transition from CCM operation to DCM operation in order to maximize power efficiency. For example, as depicted in FIG. 5, as the average of inductor current $I_L$ decreases, power converter 100 may transition from CCM to DCM to support the lighter load at a fixed frequency (e.g., f1 shown in FIG. 5).

A potential problem of operating solely in DCM in low load conditions is that the lowest average of inductor current $I_L$ is set by the minimum duty cycle of switch 108 (e.g., the minimum duration of the first phase). For example, with digital voltage-controlled feedback, such minimum duty cycle may be set by the minimum pulse of a pulse-modulated signal for controlling switch 108. In a digital current-controlled feedback scheme, such minimum duty cycle may be set by either the minimum current value that can be measured by current sensor 103 and ADC 104, a user- or platform-required minimum "on time" of switch 108, or the minimum pulse of a pulse-modulated signal for controlling switch 108.

In order to reduce this problem, several existing schemes employ a reduction in frequency (e.g., from frequency f1 to fn) at light loads while in DCM. In this scheme, the switching frequency is reduced by either extending the third phase, or skipping pulses (thus emulating an extension in the third phase). As seen in FIG. 5, such approach may allow for lower supported load levels. However, practical applications may set a limit on the minimum switching frequency of boost converter 100. This may be partly due to (but not limited to) a need to avoid switching artifacts in the band-of-interest (e.g., the audio band). Thus, such need to avoid switching artifacts inherently limits the minimum supportable load current of the amplifier.

Figure 5:
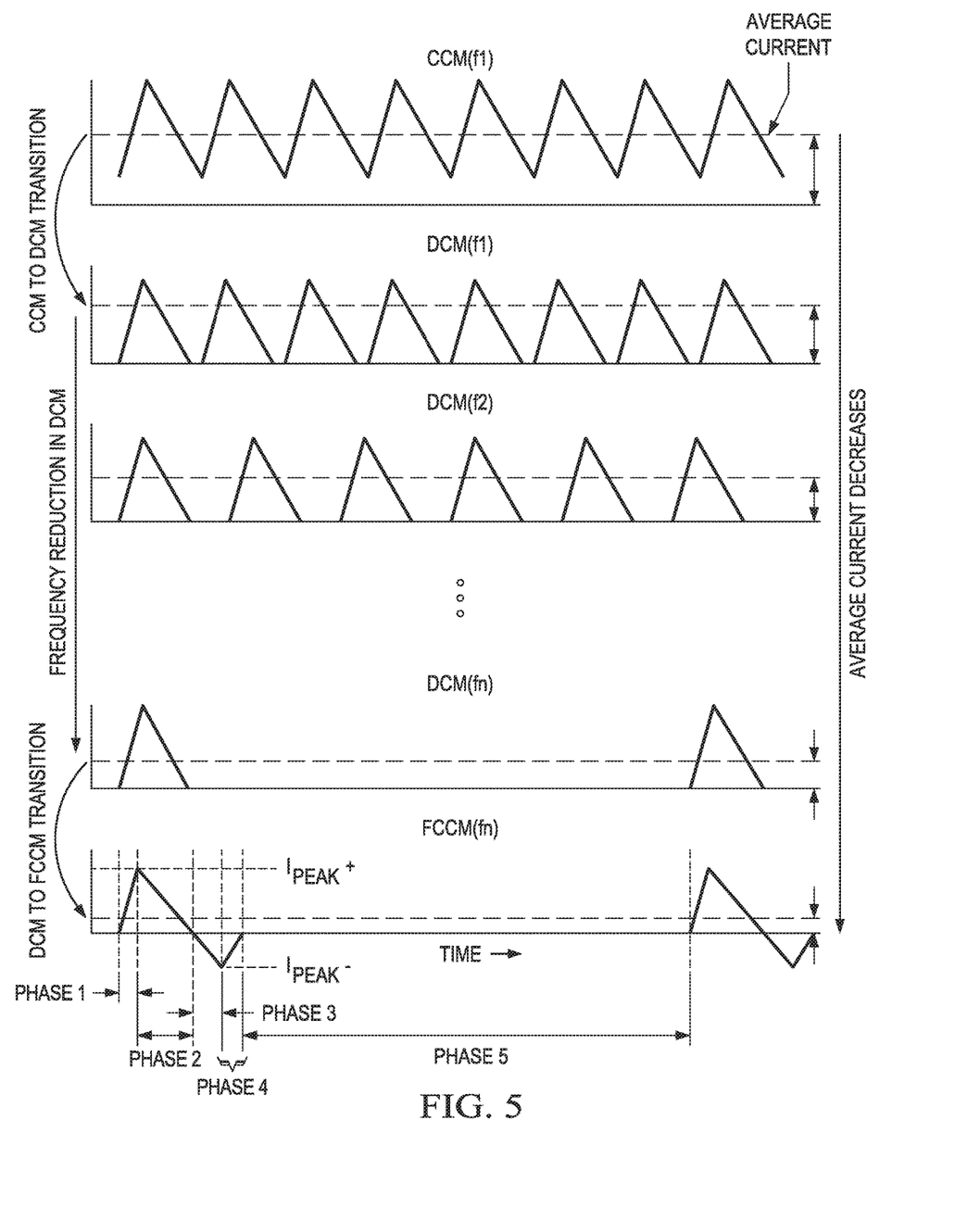
FIG. 5 illustrates graphs depicting more example waveforms of inductor current versus time for various modes of operation of the power converter of FIG. 3, in accordance with embodiments of the present disclosure.

However, in accordance with the methods and systems of the present disclosure, digital boost converter controller 101 may be configured to control switches 108 and 109 to operate boost converter 100 in a forced continuous conduction mode (FCCM), as shown in FIG. 5. In a first phase of FCCM (labeled as "Phase 1" in FIG. 5), switch 108 may be activated and switch 109 may be deactivated (e.g., by digital boost converter controller 101) which may cause inductor current $I_L$ to increase from zero to a controlled positive current magnitude $I_{PEAK}^+$. In some embodiments, controlled positive current magnitude $I_{PEAK}^+$ may be controlled based on a passage of time related to the first phase (e.g., a duration of time of the first phase is controlled by digital boost converter controller 101 in order that inductor current $I_L$ increases to approximately a desired maximum value). In other embodiments, controlled positive current magnitude $I_{PEAK}^+$ may be controlled based on a measurement of inductor current $I_L$ (e.g., by current sensor 103).

In a second phase of FCCM (labeled as "Phase 2" in FIG. 5), switch 108 may be deactivated and switch 109 may be activated (e.g., by digital boost converter controller 101), which may cause inductor current $I_L$ to decrease from controlled positive current magnitude $I_{PEAK}^+$ to approximately zero. Alternatively, in some embodiments, during the second phase of FCCM, switches 108 and 109 may both be deactivated (e.g., by digital boost converter controller 101), and a diode intrinsic to switch 109 may cause inductor current $I_L$ to decrease from controlled positive current magnitude $I_{PEAK}^+$ to approximately zero.

In a third phase of FCCM (labeled as "Phase 3" in FIG. 5), switch 108 may be deactivated and switch 109 may be activated (e.g., by digital boost converter controller 101), which may cause inductor current $I_L$ to decrease from approximately zero to a controlled negative current magnitude $I_{PEAK}^-$. In some embodiments, particularly in those in which the second phase and the third phase are operated by the deactivation of switch 108 and activation of switch 109, the second phase and the third phase may be combined into a single control phase in which inductor current $I_L$ decreases from controlled positive current magnitude $I_{PEAK}^+$ to controlled negative current magnitude $I_{PEAK}^-$.

In some embodiments, controlled negative current magnitude $I_{PEAK}^-$ may be controlled based on a passage of time related to the second phase and/or third phase (e.g., a duration of time of the second phase and/or the third phase is controlled by digital boost converter controller 101 in order that inductor current $I_L$ increases to approximately a desired minimum value). In other embodiments, controlled negative current magnitude $I_{PEAK}^-$ may be controlled based on a measurement of inductor current $I_L$ (e.g., by current sensor 103 sensing a current through switch 109).

In a fourth phase of FCCM (labeled as "Phase 4" in FIG. 5), switch 108 may be activated, and switch 109 may be deactivated (e.g., by digital boost converter controller 101), which may cause inductor current $I_L$ to increase from controlled negative current magnitude $I_{PEAK}^-$ to approximately zero. Alternatively, in some embodiments, during the fourth phase of FCCM, switches 108 and 109 may both be deactivated (e.g., by digital boost converter controller 101), and a diode intrinsic to switch 108 may cause inductor current $I_L$ to increase from controlled positive current magnitude $I_{PEAK}^-$ to approximately zero.

In a fifth phase of FCCM (labeled as "Phase 5" in FIG. 5), switches 108 and 109 may both be deactivated such that inductor current $I_L$ is zero for the duration of the fifth phase. After completion of the fifth phase, operation may return again to the first phase of FCCM.

The net effect of operation in FCCM is that charge is removed from boost capacitor 112 during the third phase in which inductor current $I_L$ is negative. Because charge is being removed from the capacitor during the third phase, the net charge transferred to boost capacitor 112 over a switching period may be much smaller than in DCM. This in turn means that a smaller load current may be used to discharge boost capacitor 112 and maintain boosted supply voltage $V_{SUPPLY}$ at its desired level, and thus allowing support for smaller load currents than operation in DCM. In addition, boost converter 100 may also control boosted supply voltage $V_{SUPPLY}$ by controlling a duration of the fifth phase (e.g., during which inductor current $I_L$ is zero).

In some embodiments of the present disclosure, boost converter 100 may operate such that for some switching cycles of boost converter 100 during operation in FCCM, boost converter 100 may operate in a first series of repeating phases including the first phase, the second phase, the third phase, and the fourth phase (e.g., the fifth phase has zero duration during such switching cycles), and for other switching cycles of boost converter 100 during operation in FCCM, boost converter 100 may operate in a second series of repeating phases including the first phase, the second phase, the third phase, the fourth phase, and the fifth phase.

By varying the number of switching cycles in which the fifth phase has a non-zero duration, even greater control of the operating range of boost converter 100 (e.g., range of boosted supply voltage $V_{SUPPLY}$) may be realized.

In some embodiments, boost converter 100 may operate in one of CCM, DCM, and FCCM based on a desired or required parameter associated with boost converter 100. For example, boost converter 100 may: (i) operate in FCCM to generate boosted supply voltage $V_{SUPPLY}$ lesser than a first threshold voltage; (ii) operate in DCM to generate boosted supply voltage $V_{SUPPLY}$ greater than the first threshold voltage and less than a second threshold parameter, in which for each switching cycle in DCM, inductor current $I_L$ is positive during a first DCM phase of each switching cycle (e.g., the aggregate of Phase A and Phase B in FIG. 4) and inductor current $I_L$ is zero during a second DCM phase (e.g., Phase C in FIG. 4) of each switching cycle; and (iii) operate in CCM to generate boosted supply voltage $V_{SUPPLY}$ greater than the second threshold voltage, in which for each switching cycle in CCM, inductor current $I_L$ is positive during an entirety of each switching cycle in CCM. In addition, although the foregoing contemplates operation in one of FCCM, DCM, and CCM based on a desired boosted supply voltage $V_{SUPPLY}$ relative to a first threshold voltage and a second threshold voltage, operation among FCCM, DCM, and CCM may be based on any parameter relative to a first threshold and a second threshold (e.g., an output power of boost converter 100 relative to a first threshold power and a second threshold power; an electrical parameter internal to boost converter 100 relative to a first electrical parameter threshold and a second electrical parameter threshold; etc.).

When operating in DCM, boost converter controller 101 may control boost converter 100 such that boosted supply voltage $V_{SUPPLY}$ may be controlled by controlling a duration of the first DCM phase (e.g., the aggregate of Phase A and Phase B in FIG. 4) between a minimum duration (e.g., DCM(fn) shown in FIG. 5) and a maximum duration (e.g., DCM(f1) shown in FIG. 5). In such embodiments, during FCCM operation, boost converter 100 may operate in the first phase and second phase of FCCM (e.g., Phases 1 and 2 shown in FIG. 5) for a period of time equal to the minimum duration of the first DCM phase (e.g., the aggregate of Phase A and Phase B in FIG. 4 operating at the minimum duration).

Although the foregoing contemplates operation in one of CCM, DCM, and FCCM based on a required boosted supply voltage $V_{SUPPLY}$, in some embodiments of the present disclosure, a boost converter 100 may operate in CCM and FCCM only, in conjunction with controlling a duration of the fifth phase (e.g., Phase 5 depicted in FIG. 5) while operating in FCCM in order to achieve lower levels of current until a minimum allowed frequency for operation in FCCM is reached. Thus, in some embodiments, boost converter 100 may operate in one of CCM and FCCM based on a desired or required parameter associated with boost converter 100. For example, boost converter 100 may: (i) operate in FCCM to generate boosted supply voltage $V_{SUPPLY}$ lesser than a threshold voltage; and (ii) operate in CCM to generate boosted supply voltage $V_{SUPPLY}$ greater than the threshold voltage, in which for each switching cycle in CCM, inductor current $I_L$ is positive during an entirety of each switching cycle in CCM. In addition or in lieu of operation in one of FCCM and CCM based on a desired boosted supply voltage $V_{SUPPLY}$ relative to a threshold voltage, operation between FCCM and CCM may be based on any parameter relative to a threshold (e.g., an output power of boost converter 100 relative to a threshold power;

an electrical parameter internal to boost converter 100 relative to an electrical parameter threshold; etc.).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method of operating a direct current-to-direct current (DC-DC) switch converter, comprising operating the DC-DC switch converter in a forced continuous conduction mode in which:
   for some switching cycles of the DC-DC switch converter during the forced continuous conduction mode, the DC-DC switch converter operates in a first series of phases including:
   a first phase in which a power inductor current flowing in a power inductor of the DC-DC switch converter increases from zero to a controlled positive current magnitude with respect to a first terminal and a second terminal of the power inductor;
   a second phase in which the power inductor current decreases from the controlled positive current magnitude to approximately zero;
   a third phase in which the power inductor current decreases from approximately zero to a controlled negative current magnitude with respect to a first terminal and a second terminal of the power inductor; and
   a fourth phase in which the power inductor current increases from the controlled negative current magnitude to approximately zero, and wherein for such switching cycles the switching cycles begin with the first phase and end with the fourth phase, with a first phase of each such switching cycle immediately following a fourth phase of a previous switching cycle at such time that the power inductor current reaches approximately zero; and for other switching cycles of the DC-DC switch converter during the forced continuous conduction mode, the DC-DC switch converter operates in a second series of phases including:
   the first phase;
   the second phase;
   the third phase;
   the fourth phase; and
   a fifth phase in which the power inductor current is zero for the duration of the fifth phase, and wherein for such other switching cycles the switching cycles begin with the first phase and end with the fifth phase, with a first phase of each such other switching cycle immediately following a fifth phase of a previous other switching cycle.

2. The method of claim 1, wherein the second phase and the third phase are combined into a single control phase in which the power inductor current decreases from the controlled positive current magnitude to the controlled negative current magnitude.

3. The method of claim 1, wherein at least one of the controlled positive current magnitude and the controlled negative current magnitude is controlled based on a passage of time related to at least one of the phases.

4. The method of claim 1, wherein at least one of the controlled positive current magnitude and the controlled negative current magnitude is controlled based on a measurement of the power inductor current.

5. The method of claim 1, further comprising:
   operating the DC-DC switch converter in the forced continuous conduction mode to generate a parameter of the DC-DC switch converter less than a threshold parameter; and
   operating the DC-DC switch converter in a continuous conduction mode to generate the parameter of the DC-DC switch converter greater than the threshold parameter, in which for each switching cycle of the DC-DC switch converter in the continuous conduction mode, the power inductor current is positive with respect to the first terminal and the second terminal of the power inductor during an entirety of each switching cycle in the continuous conduction mode.

6. The method of claim 5, wherein:
   the parameter of the DC-DC switch converter is an output voltage at an output of the DC-DC switch converter and the threshold parameter is a threshold voltage;
   the parameter of the DC-DC switch converter is an output power at an output of the DC-DC switch converter and the threshold parameter is a threshold power; or
   the parameter of the DC-DC switch converter is an electrical parameter internal to the DC-DC switch converter and the threshold parameter is a threshold electrical parameter.

7. The method of claim 1, further comprising:
   operating the DC-DC switch converter in the forced continuous conduction mode to generate a parameter of the DC-DC switch converter less than a first threshold parameter;
   operating the DC-DC switch converter in a discontinuous conduction mode to generate the parameter of the DC-DC switch converter greater than the first threshold parameter and less than a second threshold parameter, in which for each switching cycle of the DC-DC switch converter in the discontinuous conduction mode:

the power inductor current is positive with respect to the first terminal and the second terminal of the power inductor during a first DCM phase of each switching cycle; and the power inductor current of the power inductor is zero during a second DCM phase of each switching cycle; and operating the DC-DC switch converter in a continuous conduction mode to generate the parameter of the DC-DC switch converter greater than the second threshold parameter, in which for each switching cycle of the DC-DC switch converter in the continuous conduction mode, the power inductor current is positive with respect to the first terminal and the second terminal of the power inductor during an entirety of each switching cycle in the continuous conduction mode.

8. The method of claim 7, wherein:

the parameter of the DC-DC switch converter is an output voltage at an output of the DC-DC switch converter, the first threshold parameter is a first threshold voltage, and the second threshold parameter is a second threshold voltage;

the parameter of the DC-DC switch converter is an output power at an output of the DC-DC switch converter, the first threshold parameter is a first threshold power, and the second threshold parameter is a second threshold power; or the parameter of the DC-DC switch converter is an electrical parameter internal to the DC-DC switch converter, the first threshold parameter is a first threshold electrical parameter, and the second threshold parameter is a second threshold electrical parameter.

9. The method of claim 8, further comprising, during the discontinuous conduction mode, controlling a duration of the first DCM phase relative to a switching cycle period between a maximum duration and a minimum duration in order to control an output voltage.

10. The method of claim 9, further comprising, during the forced continuous conduction mode, operating the DC-DC switch converter in the first phase and the second phase of the forced continuous conduction mode for a second duration equal to the minimum duration.

11. The method of claim 1, further comprising, during the forced continuous conduction mode, controlling a duration of the fifth phase relative to a switching cycle period in order to control an output voltage.

12. A direct current-to-direct current (DC-DC) switch converter comprising:

a power inductor; and a plurality of switches coupled to the power inductor and configured to operate the DC-DC switch converter in a forced continuous conduction mode in which:

for some switching cycles of the DC-DC switch converter during the forced continuous conduction mode, the DC-DC switch converter operates in a first series of phases including:

a first phase in which a power inductor current flowing in a power inductor of the DC-DC switch converter increases from zero to a controlled positive current magnitude with respect to a first terminal and a second terminal of the power inductor;

a second phase in which the power inductor current decreases from the controlled positive current magnitude to approximately zero;

a third phase in which the power inductor current decreases from approximately zero to a controlled negative current magnitude with respect to a first terminal and a second terminal of the power inductor; and a fourth phase in which the power inductor current increases from the controlled negative current magnitude to approximately zero, and wherein for such switching cycles the switching cycles begin with the first phase and end with the fourth phase, with a first phase of each such switching cycle immediately following a fourth phase of a previous switching cycle at such time that the power inductor current reaches approximately zero; and for other switching cycles of the DC-DC switch converter during the forced continuous conduction mode, the DC-DC switch converter operates in a second series of phases including:

the first phase;

the second phase;

the third phase;

the fourth phase; and a fifth phase in which the power inductor current is zero for the duration of the fifth phase, and wherein for such other switching cycles the switching cycles begin with the first phase and end with the fifth phase, with a first phase of each such other switching cycle immediately following a fifth phase of a previous other switching cycle.

13. The DC-DC switch converter of claim 12, wherein the second phase and the third phase are combined into a single control phase in which the power inductor current decreases from the controlled positive current magnitude to the controlled negative current magnitude.

14. The DC-DC switch converter of claim 12, wherein at least one of the controlled positive current magnitude and the controlled negative current magnitude is controlled based on a passage of time related to at least one of the phases.

15. The DC-DC switch converter of claim 12, wherein at least one of the controlled positive current magnitude and the controlled negative current magnitude is controlled based on a measurement of the power inductor current.

16. The DC-DC switch converter of claim 12, wherein the plurality of switches is further configured to:

operate the DC-DC switch converter in the forced continuous conduction mode to generate a parameter of the DC-DC switch converter less than a threshold parameter; and operate the DC-DC switch converter in a continuous conduction mode to generate the parameter of the DC-DC switch converter greater than the threshold parameter, in which for each switching cycle of the DC-DC switch converter in the continuous conduction mode, the power inductor current is positive with respect to the first terminal and the second terminal of the power inductor during an entirety of each switching cycle in the continuous conduction mode.

17. The DC-DC switch converter of claim 16, wherein:

the parameter of the DC-DC switch converter is an output voltage at an output of the DC-DC switch converter and the threshold parameter is a threshold voltage;

the parameter of the DC-DC switch converter is an output power at an output of the DC-DC switch converter and the threshold parameter is a threshold power; or the parameter of the DC-DC switch converter is an electrical parameter internal to the DC-DC switch converter and the threshold parameter is a threshold electrical parameter.

18. The DC-DC switch converter of claim 12, wherein the plurality of switches is further configured to:
  operate the DC-DC switch converter in the forced continuous conduction mode to generate a parameter of the DC-DC switch converter less than a first threshold parameter;
  operate the DC-DC switch converter in a discontinuous conduction mode to generate the parameter of the DC-DC switch converter greater than the first threshold parameter and less than a second threshold parameter, in which for each switching cycle of the DC-DC switch converter in the discontinuous conduction mode:
    the power inductor current is positive with respect to the first terminal and the second terminal of the power inductor during a first DCM phase of each switching cycle; and
    the power inductor current of the power inductor is zero during a second DCM phase of each switching cycle; and
  operate the DC-DC switch converter in a continuous conduction mode to generate the parameter of the DC-DC switch converter greater than the second threshold parameter, in which for each switching cycle of the DC-DC switch converter in the continuous conduction mode, the power inductor current is positive with respect to the first terminal and the second terminal of the power inductor during an entirety of each switching cycle in the continuous conduction mode.

19. The DC-DC switch converter of claim 18, wherein:
  the parameter of the DC-DC switch converter is an output voltage at an output of the DC-DC switch converter, the first threshold parameter is a first threshold voltage, and the second threshold parameter is a second threshold voltage;
  the parameter of the DC-DC switch converter is an output power at an output of the DC-DC switch converter, the first threshold parameter is a first threshold power, and the second threshold parameter is a second threshold power; or
  the parameter of the DC-DC switch converter is an electrical parameter internal to the DC-DC switch converter, the first threshold parameter is a first threshold electrical parameter, and the second threshold parameter is a second threshold electrical parameter.

20. The DC-DC switch converter of claim 19, wherein the plurality of switches is further configured to, during the discontinuous conduction mode, control a duration of the first DCM phase relative to a switching cycle period between a maximum duration and a minimum duration in order to control the output voltage.

21. The DC-DC switch converter of claim 20, wherein the plurality of switches is further configured to, during the forced continuous conduction mode, operate the DC-DC switch converter in the first phase and the second phase of the forced continuous conduction mode for a second duration equal to the minimum duration.

22. The DC-DC switch converter of claim 12, wherein the plurality of switches is further configured to, during the forced continuous conduction mode, control a duration of the fifth phase relative to a switching cycle period in order to control an output voltage.

* * * * *